United States Patent [19] [11] 4,111,750
Colilla et al. [45] Sep. 5, 1978

[54] PROCESS FOR CONVERTING LIQUEFIED STARCH TO A MIXTURE OF GLUCOSE AND FRUCTOSE UTILIZING A MULTI-COMPONENT IMMOBILIZED ENZYME SYSTEM

[75] Inventors: William Colilla; Norman E. Lloyd, both of Clinton, Iowa

[73] Assignee: Standard Brands Incorporated, New York, N.Y.

[21] Appl. No.: 723,121

[22] Filed: Sep. 14, 1976

[51] Int. Cl.[2] .......... C12D 13/02
[52] U.S. Cl. .......... 195/31 F; 195/DIG. 11
[58] Field of Search .......... 195/31 R, 31 F, 63, 195/68, 65, 115, 111, 13, 116

[56] References Cited

U.S. PATENT DOCUMENTS

| | | | |
|---|---|---|---|
| 3,756,919 | 9/1973 | Deaton | 195/31 R |
| 3,838,007 | 9/1974 | van Velzen | 195/31 R |
| 3,897,305 | 7/1975 | Hurst | 195/31 R |
| 3,915,797 | 10/1975 | Ishimatsu et al. | 195/31 F X |
| 3,922,201 | 11/1975 | Hebeda et al. | 195/31 F |
| 3,950,222 | 4/1976 | Takasaki | 195/68 |

FOREIGN PATENT DOCUMENTS

| | | | |
|---|---|---|---|
| 2,404,101 | 8/1974 | Fed. Rep. of Germany | 195/31 F |
| 2,441,255 | 3/1975 | Fed. Rep. of Germany | 195/31 R |
| 7,137,231 | 11/1971 | Japan | 195/31 F |
| 7,216,654 | 9/1972 | Japan | 195/31 F |

OTHER PUBLICATIONS

Tsao, "Production of Sugar Mixtures from Starch with Three Native and Insolubilized Enzymes", Enzyme Technology Digest, vol. 1, No. 2, (1972) p. 82.

Lee, "Simultaneous Application of Immobilized Glucoamylase and Glucose Isomerase for the Production of Sugar Mixtures from Starch", Enzyme Technology Digest, vol. 2, No. 1, (1973) p. 10.

Lee, "Effect of Temperature and pH in the Stability and Activity of Glucoamylase and Glucose Isomerase", Paper presented at the Iowa State University Immobilized Enzyme Meeting, Ames, Iowa, (1975).

Lee et al., Final Grant Report GI-34933 (1973).

Reilly, Final Report for NSF RANN Grant ER 772-03492, ERI-76077, (1975).

Hollo et al., "Problems in the Production of Fructose Containing Syrup from Starch", Die Starke, vol. 27, No. 7, (1975), pp. 232-235.

*Primary Examiner*—Raymond N. Jones
*Assistant Examiner*—Thomas H. Wiseman

[57] ABSTRACT

A process is provided for converting liquefied starch to a mixture of glucose and fructose by the utilization of a multicomponent immobilized enzyme system. The enzyme system comprises immobilized glucoamylase, glucose isomerase and debranching enzyme.

10 Claims, No Drawings

PROCESS FOR CONVERTING LIQUEFIED STARCH TO A MIXTURE OF GLUCOSE AND FRUCTOSE UTILIZING A MULTI-COMPONENT IMMOBILIZED ENZYME SYSTEM

BACKGROUND OF THE INVENTION

Processes for converting liquefied starch to a mixture of fructose and glucose are well known in the art. Generally, these processes involve treating the starch with glucoamylase to obtain a product with a high glucose content and then treating such a product with glucose isomerase to convert a portion of the glucose to fructose.

Exemplary of processes for converting starch with enzyme systems comprising more than one enzyme are those taught by Hurst in U.S. Pat. No. 3,897,305 wherein liquefied starch is treated with soluble glucoamylase and pullulanase and by Hebeda et al. in U.S. Pat. No. 3,922,201 wherein ungelatinized starch is treated with a system comprising soluble alpha-amylase, glucoamylase and glucose isomerase.

A number of immobilized enzyme systems have been disclosed in the art. G. T. Tsao (*Enzyme Technology Digest,* Vol. 1, No. 2, Nov. 1972) and P. I. Y. Y. Lee (*Enzyme Technology Digest,* Vol. 2, No. 1 July 1973) reported certain proposals for the simultaneous utilization of immobilized glucose isomerase and glucoamylase. G. K. Lee presented a paper dealing with the joint use of immobilized glucoamylase and glucose isomerase in a mixed bed reactor (Iowa State University Immobilized Enzyme Meeting, Ames, Iowa, January 1975).

Y. Y. Lee et al. in Final Grant Report NSF GI-34933, June 1973 and P. J. Reilly in Final Report for NSF RANN Grant ER 772-03492, ERI-76077, October 1975, disclosed various immobilized enzyme systems. Y. Takasaki, in Japanese Patent NS 16654/72 reported the joint use of glucoamylase and glucose isomerase in both soluble and immobilized forms to convert liquefied starch to a glucose-fructose mixture. German Patent 2,404,101 also discloses the combined use of glucoamylase and glucose isomerase.

Hollo et al., Die Starke, Vol. 27, No. 7, pp. 232–35, 1975, teaches the utilization of immobilized glucose isomerase and glucoamylase in alternate beds to convert liquefied starch to a 96 D.E. product. German Pat. No. 2,441,255 discloses the use of a combination of immobilized beta-amylase and pullulanase for the conversion of liquefied starch to a high maltose syrup.

OBJECTS OF THE INVENTION

It is the principal object of the present invention to provide a process for converting liquefied starch to a mixture of glucose and fructose by the utilization of a multicomponent immobilized enzyme system.

It is a further object of the present invention to provide a mixture of glucose and fructose by the utilization of a multicomponent immobilized enzyme system under conditions whereby substantially all the starch is converted to glucose and fructose.

SUMMARY OF THE INVENTION

This invention relates to a process for obtaining high yields of glucose and fructose from liquefied starch. Liquefied starch is treated with an enzyme system comprising immobilized glucoamylase, immobilized glucose isomerase and immobilized debranching enzyme at a pH and temperature whereby substantially all the starch is converted to glucose and fructose.

DETAILED DESCRIPTION OF THE INVENTION

A number of techniques disclosed in the art may be utilized for immobilizing enzymes. These techniques include covalently bonding an enzyme to a suitable insoluble carrier, encapsulation of an enzyme within a material which is impermeable to the enzyme but permeable to the substrate and the products of the catalyzed reaction, adsorption of an enzyme on an insoluble carrier, and entrapment of an enzyme within a porous polymeric material wherein the pores are of such a size as will provide free access of the substrate and the catalyzed reaction products but which are sufficiently small to prevent the escape of the enzyme.

The liquefied starch utilized in the present process is preferably obtained by enzyme liquefaction and has a D.E. of greater than about 25. At lower D.E.'s there is the possibility of retrograded particles being present in the liquefied starch which precipitate on the immobilized enzyme thereby decreasing the efficiency of the enzymes. Additionally the lower D.E. liquefied starches have longer average chain lengths which hinder the diffusion thereof to the active sites of the immobilized enzymes and also create the problem of steric hindrance.

It is preferred that the type of debranching enzyme utilized have an action pattern such that it readily hydrolyzes the alpha-1,6 bond of branched molecules of the lower molecular weight dextrins. An example of such an enzyme is pullulanase, while an example of an enzyme which more readily cleaves branched molecules of higher molecular weight is isoamylase.

Optimum conditions for the catalytic action of glucose isomerase, glucoamylase and pullulanase differ somewhat. In certain instances immobilization of enzymes will change the optimum pH and thermal stability characteristics. When the three enzymes are used simultaneously, it is preferred that the reaction be carried out under conditions which represent some degree of compromise relative to all three in terms of temperature and pH. While the amounts of immobilized enzymes may vary widely, typically the ratio of activity of isomerase to glucoamylase is at least 2 IGIU per GU and in the case of the ratio of pullulanase to glucoamylase it is at least 0.1 IU per GU. Most preferably the ratio of activity of isomerase to glucoamylase is at least 5 IGIU per GU and in the case of the ratio of activity of pullulanase to glucoamylase it is at least 2 IU per GU.

There are a number of advantages associated with the use of the multicomponent enzyme system of the present invention for converting liquefied starch to a mixture of glucose and fructose. In the preferred embodiment, an immobilized three-enzyme system comprising immobilized glucose isomerase, gluco-amylase, and pullulanase is used to simultaneously debranch, saccharify and isomerize liquefied starch. Utilizing this multicomponent enzyme system results in substantially increased rate of conversion of liquefied starch to monosaccharides as well as increasing the overall conversion of the starch to monosaccharides. These and other advantages of the present invention provide significant economic advantages in the production of glucose and fructose containing solutions.

Although it is preferred that the glucose isomerase be immobilized on a separate inert carrier from that on which glucoamylase and pullulanase are immobilized, all three enzymes may be immobilized on the same carrier. Alternatively, each enzyme may be immobilized on a separate carrier.

The amounts of the various immobilized enzymes used and the activities thereof will vary depending on a number of factors, e.g., the particular immobilized enzyme, reaction conditions, resulting end product, etc.

The conditions of pH and temperature at which the immobilized enzymes are utilized to convert liquefied starch to a mixture of glucose and fructose will also vary but should not be such as would inactivate any of the enzymes or deleteriously affect the reaction products. When all three enzymes are used in a mixed bed the process may be carried out at a pH in the range of from about 4.5 to about 8 and at a temperature in the range of from about 5° to about 60° C. The preferred pH and temperature are from about 6 to about 7 and from about 35° C to about 55° C respectively.

The present invention may be carried out in batch or continuous systems including mixed beds, sequential beds, single or multiple columns, batch recycling, differential reactors, fluidized beds, etc.

When the three component immobilized enzyme system is utilized in a sequential manner, the conditions of such use can be changed to fit the optimum conditions of each particular immobilized enzyme. For instance, the pH and the temperature of the substrate may be adjusted either before or after each immobilized enzyme treatment.

In carrying out the present process in a sequential manner, there are two treatment sequences possible. The first treatment would comprise contacting the liquefied starch with immobilized glucoamylase, next with immobilized pullulanase, then with immobilized glucose isomerase and then again with immobilized glucoamylase. The second treatment would comprise contacting the liquefied starch with immobilized pullulanase, then with immobilized glucoamylase, next with immobilized glucose isomerase and then again with immobilized glucoamylase.

ANALYTICAL METHODS

Dextrose Equivalent

Dextrose equivalent (D.E.) is defined as reducing sugars expressed as dextrose and calculated as a percentage of the dry substance. Dextrose equivalent (D.E.) was determined by Method E-26 described in "Standard Analytical Methods of the Member Companies of the Corn Industries Research Foundation," Corn Refiner's Association, Inc., 1001 Connecticut Avenue, N.W., Washington, D.C. 20036.

Carbohydrate Composition

Carbohydrate composition was determined by high pressure liquid chromatography (L.C.), using the calcium form of BioRad Aminex 50W-X4 resin (20–30 $\mu$) in a 2' × $\frac{3}{8}$ inch O.D. column at 78° C in a Waters Associates Model 201. Degassed deionized water as eluant was pumped at 0.37 ml/min. Carbohydrates eluted from the column were detected by means of a Waters Associates Model 401 Differential Refractometer at 35° C, and identified by their retention times. Results obtained are quantified with the Autolab System I computing integrator.

Glucoamylase Activity

A glucoamylase acitivity unit (GU) is defined as the amount of enzyme which catalyzes the production of one g of dextrose per hour at 60° C at pH 4.5 in the procedure described below.

10 ml of a 10% solution of a partially hydrolyzed starch (such as Maltrin-10, a product of Grain Processing Co., Muscatine, Iowa), containing 20 mM acetate buffer at pH 4.5, was pipetted into a capped reactor maintained at 60° C. One ml of an immobilized glucoamylase dispersion, containing 0.03 to 0.15 GU was added and mixed therein, and the mixture was maintained for 1 hour at 60° C. at the end of the 1 hour incubation period, enzyme action was stopped by adding a predetermined volume of 1 M sodium hydroxide so as to obtain a pH of 8.5 to 10.5. The mixture was then cooled to room temperature.

2.5 ml of the assay hydrolysate so obtained was pipetted into 25 ml of Fehling's solution prepared as described in the above cited method for DE determination. The mixture was brought to a boil and titrated with standard dextrose solution containing 5 g of dextrose per liter according to the procedure cited above for DE determination. A control mixture was prepared and titrated in the exact same manner as for the assay hydrolysate above except that the 1 ml of glucoamylase solution was added to the substrate solution after the one-hour incubation period and after the addition of sodium hydroxide solution. Glucoamylase activity was calculated as follows:

$$\frac{GU}{g} = 0.002\ V\frac{(C-A)}{W}$$

where V is the total volume (ml) of assay hydrolysate (usually 11.2 ml), C is the ml of standard dextrose solution used in the titration of the control mixture, A is the ml of standard dextrose solution used in the titration of the assay hydrolysate, and W is the weight of immobilized enzyme per ml of enzyme dispersion.

Immobilized Isomerase Activity

Immobilized isomerase activity was determined by the following procedure.

An immobilized isomerase sample containing 1400–2200 IGIU was weighed out. The sample was washed into a 250 ml flask with 125 ml dextrose assay solution (previously warmed to 65° C) and 10 ml of 0.1 M tris-hydroxymethylaminomethane (THAM) solution (pH 7.8). Dextrose assay solution contained 3.33 M dextrose, 20 mM magnesium sulfate, 10 mM sodium sulfite, 100 mM THAM and 1 mM cobalt chloride (pH 7.8). At 65° C this dextrose solution has a pH value of 7.0. The flask was immersed in a 65° C water bath and shaken for 1 hour. The mixture was vacuum-filtered through a 45 mm coarse fritted glass funnel fitted with a glass fiber filter and precoated with 1 g of filter-aid. The flask and enzyme cake were rinsed with small aliquots of 100 mM THAM buffer solution (pH 7.8) totaling 100 ml.

This washed enzyme was added to a 250 ml flask containing 125 ml dextrose assay solution (previously equilibrated to 65° C). The washed enzyme was quantitatively washed into the flask with 10 ml of 10 mM THAM buffer (pH 7.8), and the flask was shaken for exactly 60 minutes. 12.0 ml glacial acetic acid was then added, and the acidified mixture shaken for a further 15 minutes. The mixture was vacuum-filtered through a 45 mm coarse fritted glass funnel fitted with a glass fiber filter and precoated with approximately 1 g filter-aid. The flask and the funnel contents were washed with demineralized water until approximately 400 ml of filtrate was collected. The filtrate cooled to 25° C was diluted to 500 ml. The rotation of the solution was determined with a 2 dm cell at 25° C as $R_2$.

A blank was processed in the same manner as above, except no enzyme was added. The optical rotation of the blank was also determined at 25° C as $R_1$. The degree of isomerization is calculated from the following relationship:

$$I = \frac{(R_2 - R_1)}{\alpha\, C_p L}$$

where $\alpha$ is the specific rotation change when fructose is completely converted to dextrose, Cp is the concentration of sugar in solution (0.15 g/ml), and L is length of polarimeter tube (2 dm).

Fixed activity units (FAU) of the isomerase activity is calculated as follows.

$$FAU/g = JC/k_f t\, w$$

where $k_f$ is a rate constant (1.21 I $hr^{-1}$ $FAU^{-1}$ mg glucose), $t$ is the reaction time in hours (1 hr.), w is the weight in g of the sample, C is the initial concentration in mg per 125 ml reaction mixture (75,000 mg glucose), and J is defined as follows:

$$J = \left[ I_e\left(\frac{K_s}{C_m} + 1\right) + I_e^2\left(\frac{K_s}{K_p} - 1\right)\right] \ln\left(\frac{I_e}{I_e - I}\right) - I_e I\left(\frac{K_s}{K_p} - 1\right)$$

where $I_e$ = degree of isomerization at equilibrium in mole fraction of fructose (0.513)

I = degree of isomerization in mole fraction of fructose $C_m$ = initial molar concentration of glucose (3.33 M)

$K_s$ = Michaelis constant for glucose (0.7 M)

$K_p$ = Michaelis constant for fructose (1.43 M)

One IGIU is equal to 15.8 FAU's.

Activity of Immobilized Pullulanase Preparation

Immobilized pullulanase activity was determined by its hydrolytic effect on pullulan using an alkaline ferricyanide reagent to determine the maltotriose liberated. Activity was expressed in international units (IU) where one IU is the amount of pullulanase which catalyzes the liberation of 1 $\mu$ mole of maltotriose per minute from a 0.5 percent solution of pullulan at pH 5.0 and 45° C. The following procedure was used.

Ferricyanide reagent was prepared by dissolving 0.85 g potassium ferricyanide and 10 g sodium carbonate in demineralized water and diluting to one liter. The reagent was calibrated against solutions of maltotriose (Pierce Chemical Co.). 2 ml aliquots of ferricyanide reagent were mixed in test tubes with 1 ml aliquots of maltotriose solutions containing 25, 100, 150, 200 and 250 micrograms of maltotriose per ml. The tubes were immersed in a boiling water bath for 10 minutes and then cooled for 10 minutes at ambient temperature and absorbance measured in a 1 cm cell at 420 nm. Maltotriose concentration was plotted versus absorbance and a calibration factor (C) determined from the slope of the plot.

To determine pullulanase activity, a test tube containing 9.0 ml of substrate solution comprising 1.0 ml of 0.20 M sodium acetate (pH 5.0), 5 ml of a solution containing 50 mg pullulan and 3.0 ml of deionized water was incubated in a 45° C bath for 5 minutes. A 1.0 ml aliquot of pullulanase dispersion (at a concentration of 0–0.1 IU/ml) was added to the test-tube and mixed. The reaction mixture was constantly stirred during the reaction period. Aliquots of 1.0 ml were withdrawn at 5, 10, 15, 20 and 25 minutes after addition of pullulanase dispersion, and added to test tubes containing 2.0 ml of ferricyanide reagent. The mixtures were heated, cooled and their absorbances determined as for the calibration of the ferricyanide reagent above. Absorbance versus time was plotted and the slope (K) of the rate plot determined. Activity of pullulanase dispersion was calculated from the following formula:

$$IU/g = 0.0198\ CK/w$$

where C is the ferricyanide reagent calibration factor (micrograms of maltotriose per ml per absorbance unit), K is the slope of the rate plot (absorbance units per minute), and w is the weight of sample used for assay.

Activity of Immobilized Pullulanase in the Presence of Immobilized Glucoamylase Activity of immobilized pullulanase in the presence of immobilized glucoamylase was determined in exactly the same manner as for immobilized pullulanase by itself. The calculation of the activity was different and is based on the assumption that there was always an excess of glucoamylase, so that all the maltotriose produced as a result of pullulanase action was completely converted to dextrose. The activity of immobilized pullulanase was calculated from the following formula:

$$\frac{IU}{g} = 0.0198\,\frac{CK}{wN}$$

where N is a correction factor for C to account for the dextrose produced. In this case N = 2.1. Thus $$\frac{IU}{g} = 0.0094\,\frac{CK}{w}$$

In order to more clearly describe the nature of the present invention, specific examples will hereinafter be described. It should be understood, however, that this is done solely by way of example and is not intended to delineate the scope of the invention or limit the ambit of the appended claims.

EXAMPLE I

This Example illustrates the use of immobilized glucoamylase, pullulanase and glucose isomerase in a stirred reactor to convert liquefied starch to a mixture comprising essentially fructose and glucose.

To a solution containing glucose isomerase at a pH of 6.5 and a temperature of 40° C was added sufficient DEAE-cellulose to adsorb all the isomerase. The mixture was filtered and the filter cake washed extensively with deionized water. Co-immobilization of glucoamylase and pullulanase was carried out by dispersing sufficient DEAE-cellulose (1 g DEAE-cellulose per 200 GU & 200 IU) in a solution at a pH of 7 and ambient temperature containing glucoamylase and pullulanase (about 1 GU/ml and about 1 IU/ml, respectively). The mixture was stirred for one hour and filtered and the filter cake washed with 0.01 M maleate buffer (pH 6.7).

A stirred reactor was charged with 200 g of a solution of 30% (w/w) oxalate-treated, calcium-free, 29 DE liquefied starch, pH 6.8, which contained 0.005 moles per liter magnesium sulfate, 0.01 moles per liter sodium bisulfite, and 0.02% (w/v) sodium azide (as preservative). Sufficient amounts of the immobilized enzymes were then added to achieve a level of enzyme activity per gram of substrate of 1.30 IU pullulanase, 1.69 GU glucoamylase, and 7.35 IGIU glucose isomerase. The reaction mixture was maintained for a number of hours at pH 6.8 and 45° C under a blanket of nitrogen while being continuously stirred. The carbohydrate composition of the mixture was determined at various intervals. The results of these determinations are set forth below in Table I.

TABLE I

Conversion of Liquefied Starch by Simultaneous Utilization of Three-Component Immobilized Enzyme System

| Reaction Time (hrs) | Carbohydrate Composition in Percent* Dextrose | Fructose | Total Monosaccharides |
|---|---|---|---|
| 21 | 46.6 | 15.3 | 61.9 |
| 45 | 54.1 | 26.1 | 80.2 |
| 69 | 57.4 | 35.6 | 93.0 |
| 114 | 54.3 | 41.6 | 95.9 |
| 136 | 52.7 | 43.3 | 96.0 |
| 160 | 51.4 | 44.4 | 95.8 |
| 184 | 51.2 | 45.0 | 96.2 |

*Ash-free carbohydrate basis

From the data in the above table, it can be seen that substantially complete conversion of a liquefied starch substrate to monosaccharides can be achieved.

EXAMPLE II

This Example illustrates the utilization of various combinations of immobilized enzymes to convert liquefied starch to a mixture of saccharides.

Glucoamylase and pullulanase were co-immobilized as shown in Example I except that immobilization was carried out at a pH of 7.4. The immobilized glucoamylase was prepared by the method described in Example I except no pullulanase was present. The immobilized glucose isomerase preparation utilized was prepared by SNAM Progetti (Rome, Italy) by encapsulation of the enzyme in cellulose triacetate fibers. Fiber-encapsulated enzymes are described by D. Dinelli in *Process Biochemistry,* vol. 7, No. 8, pp. 9–12, Aug. 1972, and by S. Giovenco et al., *FEBS Letters,* Vol. 36, No. 1, pp. 57–60, Oct. 1973.

Three reactors, each containing 310 ml of a solution of a 30.16% (w/w) calcium-free 29.5 DE liquefied starch (pH 6.5), were incubated in a 45° C water bath. To these reactors were added the different combinations of the three enzymes shown on Table II. In the reactor where no glucose isomerase was present, the liquefied starch also contained 0.005 moles per liter calcium chloride and 0.005 moles per liter sodium phosphate. In the isomerase-containing reactors, however, the liquefied starch solution contained in place of the above salts 0.005 moles per liter magnesium sulfate and 0.01 moles per liter sodium bisulfite. All reactors also contained 0.02% sodium azide as preservative.

In the reactors in which the various immobilized enzymes were utilized, sufficient amounts thereof were added to provide per gram of substrate 0.62 IU of pullulanase, 1.47 GU of glucoamylase, and 6.95 IGIU of glucose isomerase.

The reaction mixtures were maintained at the above stated conditions and stirred for a number of hours. The progress of the conversions were followed by periodic sampling of the reaction mixtures and determining the carbohydrate composition thereof by liquid chromatography. The results of these determinations are shown in Table II.

TABLE II

Conversion of Liquefied Starch by Various Combinations of Immobilized Enzymes

| Composition | Reaction Time (hrs.) | Dextrose | Fructose | Maltulose | Other Dissaccharides | Higher Saccharides | Fructose + Dextrose |
|---|---|---|---|---|---|---|---|
| | 47 | 94.9 | 0.3 | 0.06 | 1.5 | 3.2 | 95.2 |
| | 67 | 95.4 | 0.3 | 0.11 | 1.6 | 2.6 | 95.7 |
| Pullulanase | 95 | 96.1 | 0.6 | 0.04 | 1.6 | 1.8 | 96.7 |
| + | 115 | 96.0 | 0.4 | 0.06 | 1.7 | 1.8 | 96.4 |
| Glucoamylase | 139 | 96.1 | 0.5 | 0.05 | 1.7 | 1.6 | 96.6 |
| (Reactor 1) | 164 | 96.1 | 0.5 | 0.06 | 1.9 | 1.5 | 96.6 |
| | 188 | 96.4 | 0.6 | 0.06 | 1.8 | 1.24 | 97.0 |
| | 212 | 96.5 | 0.6 | 0.06 | 1.9 | 1.0 | 97.1 |
| | 288 | 96.3 | 0.9 | 0.10 | 2.1 | 0.8 | 97.2 |
| | 47 | 50.3 | 37.5 | 0.03 | 0.74 | 11.4 | 87.3 |
| | 67 | 48.5 | 40.8 | 0.06 | 0.54 | 10.1 | 89.3 |
| Glucoamylase | 95 | 48.5 | 43.7 | 0.04 | 0.21 | 7.4 | 92.2 |
| + | 115 | 48.2 | 44.3 | 0.04 | 0.47 | 6.7 | 92.5 |
| Isomerase | 139 | 48.1 | 44.6 | 0.05 | 0.49 | 6.6 | 92.7 |
| (Reactor 2) | 164 | — | — | — | — | — | — |
| | 188 | 48.1 | 45.2 | 0.09 | 0.73 | 5.8 | 93.3 |
| | 212 | 48.5 | 45.8 | 0.07 | 0.63 | 4.7 | 94.3 |
| | 288 | 48.7 | 46.4 | 0.06 | 0.69 | 4.0 | 95.1 |
| | 47 | 60.2 | 36.1 | 0.04 | 0.76 | 2.8 | 96.3 |
| | 67 | 56.3 | 41.0 | 0.07 | 0.77 | 1.8 | 97.3 |
| Pullulanase | 95 | 53.2 | 44.5 | 0.05 | 0.79 | 1.4 | 97.7 |
| + | 115 | 52.0 | 45.5 | 0.09 | 0.84 | 1.5 | 97.5 |
| Glucoamylase | 139 | 50.7 | 46.5 | 0.09 | 0.96 | 1.6 | 97.2 |
| + | 164 | 50.9 | 46.9 | 0.08 | 0.99 | 1.1 | 97.8 |
| Isomerase | 188 | 50.6 | 47.5 | 0.06 | 1.12 | 0.7 | 98.1 |
| (Reactor 3) | 212 | 50.4 | 47.6 | 0.07 | 1.13 | 0.7 | 98.0 |

TABLE II-continued

| Composition | Reaction Time (hrs.) | Dextrose | Fructose | Maltulose | Other Dissaccharides | Higher Saccharides | Fructose + Dextrose |
|---|---|---|---|---|---|---|---|
| | | Conversion of Liquefied Starch by Various Combinations of Immobilized Enzymes | | | | | |
| | 288 | 50.0 | 48.2 | 0.05 | 1.32 | 0.4 | 98.2 |

From the data in the above table, it can be seen that the fastest and most complete conversion of liquefied starch to a mixture of glucose and fructose occurred in the reactor containing immobilized pullulanase, glucoamylase and glucose isomerase.

EXAMPLE III

32% (w/w) substrate solutions of 25–30 DE liquefied starch were prepared to contain 0.005 moles per liter sodium bisulfite, 0.005 moles per liter magnesium sulfate, and 0.02% sodium azide. Immobilized pullulanase, glucoamylase and glucose isomerase, prepared as shown in Example II were independently slurried in the substrate solution. Sufficient immobilized glucose isomerase was first packed in the bottom of a jacketed 2.54 cm (ID) × 50 cm column to provide about one-third of the total glucose isomerase activity and a mixture comprising a slurry of the remaining enzyme preparations was added thereto. A total of 189 IU of pullulanase, 592 GU of glucoamylase and 2650 IGIU of glucose isomerase was used in the column.

The immobilized enzyme preparations in the column were washed with the substrate solution for 18 hours at a flow rate of 0.22 ml/min. The substrate solution was then pumped continuously through the column at a rate of 0.18 ± 0.04 ml/min for 96 days. During this period, 96.6 to 98.2 percent of the liquefied starch was converted to monosaccharides of which 45 ± 3 percent was fructose.

Another experiment was carried out in exactly the same manner as shown immediately above with the exception that immobilized glucose isomerase Type F, containing 291.5 IGIU/moist g produced by NOVO Enzyme Corporation was utilized. Sufficient immobilized enzyme preparations were placed in the column to provide therein 1810 GU of glucoamylase, 593 IU of pullulanase and 5300 IGIU of glucose isomerase. The substrate was pumped through the column for 21 days at a flow rate of 0.342 ± 0.015 ml/min. During this period, 96.5 to 98.2 percent of the liquefied starch pumped through the column was converted to monosaccharides of which 45.2 ± 1.8% was fructose.

The terms and expressions which have been employed are used as terms of description and not of limitation, and it is not intended, in the use of such terms and expressions, to exclude any equivalents of the features shown and described or portions thereof, since it is recognized that various modifications are possible within the scope of the invention claimed.

What is claimed is:

1. A method for producing a solution containing glucose and fructose comprising treating liquefied starch having a DE of greater than 25 with an enzyme system comprising immobilized glucoamylase, immobilized glucose isomerase and immobilized debranching enzyme said debranching enzyme being selected from the group consisting of immobilized pullulamase immobilized isoamylase and mixtures thereof at a pH and temperature whereby substantially all the starch is converted to glucose and fructose.

2. A method for producing a solution containing glucose and fructose as defined in claim 1 wherein the liquefied starch is prepared by an enzymatic treatment and has a DE of greater than 25.

3. A method for producing a solution containing glucose and fructose as defined in claim 2 wherein the immobilized debranching enzyme is immobilized pullulanase.

4. A method for producing a solution containing glucose and fructose as defined in claim 3 wherein the ratio of immobilized glucose isomerase to immobilized glucoamylase is at least 2 IGIU per GU and the ratio of immobilized pullulanase to immobilized glucoamylase is at least 0.1 IU per GU.

5. A method for producing a solution containing glucose and fructose as defined in claim 4 wherein the ratio of immobilized glucose isomerase to immobilized glucoamylase is at least 5 IGIU per GU and the ratio of immobilized pullulanase to immobilized glucoamylase is at least 2 IU per GU.

6. A method for producing a solution containing glucose and fructose as defined in claim 4 wherein the enzyme system is a mixed bed of the immobilized enzymes.

7. A method for producing a solution containing glucose and fructose as defined in claim 4 wherein the treatment of the liquefied starch with the enzyme system is conducted at a pH in the range of from about 4.5 to about 8 and at a temperature in the range of from about 5° C to about 60° C.

8. A method for producing a solution containing glucose and fructose as defined in claim 7 wherein the treatment of the liquefied starch with the enzyme system is conducted at a pH in the range of from about 6 to about 7 and at a temperature in the range of from about 35° C to about 55° C.

9. A method for producing a solution containing glucose and fructose as defined in claim 4, wherein the liquefied starch is contacted sequentially with immobilized glucoamylase, immobilized pullulanase, immobilized glucose isomerase and, lastly, with immobilized glucoamylase.

10. A method for producing a solution containing glucose and fructose as defined in claim 4, wherein the liquefied starch is contacted sequentially with immobilized pullulanase, immobilized glucoamylase, immobilized glucose isomerase and, lastly, with immobilized glucoamylase.

* * * * *